M. Clark.
Corn Stalk Cutter.
No. 91,420.          Patented Jun. 15, 1869.
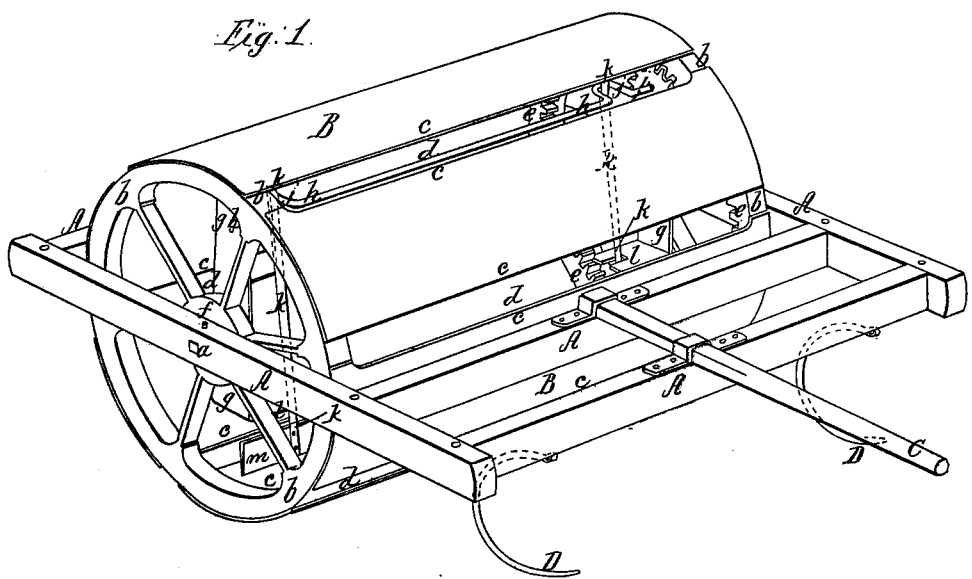
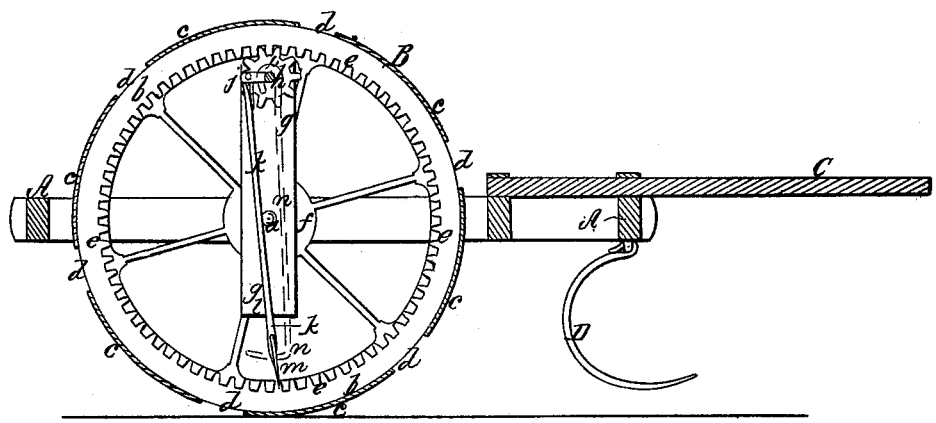
Witnesses:
J. E. N. Bowen
Edmund Masson
Inventor:
Milton Clark
By atty A. V. Stoughton

United States Patent Office.

MILTON CLARK, OF OAKLEY, ILLINOIS.

Letters Patent No. 91,420, dated June 15, 1869.

IMPROVEMENT IN CORN-STALK CUTTERS.

The Schedule referred to in these Letters Patent and making part of the same.

*To all whom it may concern:*

Be it known that I, MILTON CLARK, of Oakley, in the county of Macon, and State of Illinois, have invented certain new and useful Improvements in Corn-Stalk Cutters; and that the following is a full, clear, and exact description of the same, reference being had to the accompanying drawings, making a part of this specification, in which—

Figure 1 represents a perspective view of the machine, and

Figure 2 represents a vertical transverse section through the same.

Similar letters, where they occur in the separate figures, denote like parts in both of the drawings.

My invention consists in combining, with a revolving slotted cylinder, a reciprocating knife or cutter, arranged and operating within the cylinder, and projecting, in its cutting-operation, through the slots or open spaces in the cylinder, so that whilst the cylinder rolls over and holds the stalks, the cutter shall sever them into pieces.

To enable others skilled in the art to make and use my invention, I will proceed to describe the same, with reference to the drawings.

In a frame A, of any suitable size, shape, and structure, are arranged journals or bearings, $a\ a$, on which a cylinder, B, is hung, and revolves, on being drawn over the ground.

The cylinder may be made of open-work heads, $b\ b$, in the form of a hub and spoke-wheel, and its perimeter is composed of sections $c$, extending from head to head, with slots or spaces $d\ d$, &c., between said sections.

The heads $b\ b$ may have each an internal cogged rim, $e$, formed on or attached to them, though I have shown only one so furnished.

The journals or bearings $a\ a$ are fixed on or in the frame, and pass through the hubs or centres $f\ f$ of the cylinder-heads, the cylinder turning upon said bearings, which are stationary.

On the inside of the cylinder there is connected to each bearing or journal, an arm or support, $g$, extending above and below said bearing, and in the upper ends of these arms or supports $g$, there is hung a crank-rod or shaft, $h$, which carries a pinion, $i$, that is driven by the internal cogged rim $e$; or, if there be a cogged rim on each head, which would make the gears and crank-shaft work more accurately, and without binding or cutting, then there would be a pinion, $i$, at each end of the crank-shaft $h$.

To the cranks $j\ j$, on the crank-rod $h$, are connected, respectively, the upper ends of the pitmen or connecting-rods $k\ k$, the lower ends of which pass through guides $l$, turned or formed on the lower ends of the arms $g\ g$, and are then connected to a cutter or blade, $m$, so that the turning of the crank-shaft $h$ gives a vertically-reciprocating motion to the cutter $m$, and so timed, as that every time the cutter descends, it shall strike through one of the openings $d$. I have shown, by red lines in fig. 2, how the cutter may be prevented from working or striking through the slots of the cylinder, when the machine is being transported to or from the place where it is to be worked, viz, by a hook, $n$, that catches over the crank-rod $h$, and under the knife $m$, the pinion $i$ having been moved out of gear with the gear $e$, and held by a pin, or a clutch; or any other connecting or disconnecting-apparatus used for throwing cogged gearing into or out of mesh, may be used.

O is the tongue, by which the machine is guided, or drawn by the team.

Under the front of the frame are hung hooks D D, which are designed for gathering such stalks as may lie on either side of the path of the machine, and draw them under the roller or cylinder, to be acted upon by the cutter.

The operation of the machine is obvious.

The roller or cylinder, rolls down the stalks, and whilst holding them by its weight, the cutter, striking through the openings in the cylinder, severs them into pieces, and when the cutter is thrown out of action, as above stated, the openings $d$ may be planked over or closed, and the machine used as a common field-roller, and thus make one implement serve two valuable farming-purposes.

Having thus fully described my invention,

What I claim therein as new, and desire to secure by Letters Patent, is—

In combination with a revolving slotted cylinder, a reciprocating knife or cutter, arranged and operated in the interior of said cylinder, and so as to strike through the slots or openings therein, substantially in the manner and for the purpose described and represented.

MILTON CLARK.

Witnesses:
A. R. FEARN,
GEO. W. BRIGHT.